(12) United States Patent
Cho et al.

(10) Patent No.: US 7,676,175 B2
(45) Date of Patent: Mar. 9, 2010

(54) PHOTOSENSITIVE DRUM FOR PRINTER CARTRIDGE AND METHOD FOR MOUNTING THE SAME

(75) Inventors: Myung-Lae Cho, Daejeon (KR); Michael Han, Seoul (KR); Han-Shik Kim, Daejeon (KR); Seong-Jin Cho, Cheongju-si (KR); Jun-Ho Jeon, Chungcheongbuk-Do (KR)

(73) Assignee: Park & OPC Co., Ltd. (KR)

( * ) Notice: Subject to any disclaimer, the term of this patent is extended or adjusted under 35 U.S.C. 154(b) by 719 days.

(21) Appl. No.: 11/520,941

(22) Filed: Sep. 13, 2006

(65) Prior Publication Data

US 2007/0237545 A1    Oct. 11, 2007

(30) Foreign Application Priority Data

Apr. 5, 2006    (KR) .................. 10-2006-0030790

(51) Int. Cl.
    *G03G 15/00*    (2006.01)
(52) U.S. Cl. ................... 399/117; 399/116; 399/159
(58) Field of Classification Search ................. 399/116, 399/117, 159
    See application file for complete search history.

(56) References Cited

U.S. PATENT DOCUMENTS 6,381,429 B1 * 4/2002 Shibata et al. ............... 399/117
2008/0279584 A1 * 11/2008 Huang et al. ................ 399/117

\* cited by examiner

*Primary Examiner*—David M Gray
*Assistant Examiner*—Ruth N Labombard
(74) *Attorney, Agent, or Firm*—Blakely, Sokoloff, Taylor & Zafman

(57) ABSTRACT

A photosensitive drum for a printer cartridge, which can be easily mounted on a printer cartridge of which the positions of drum connectors are fixed, is disclosed. The photosensitive drum for a printer cartridge comprises a cylindrical drum having a photosensitive layer on a cylindrical surface thereof; and a pair of rotation shafts which is respectively mounted on the sides of the cylindrical drum for rotating and supporting the cylindrical drum, wherein at least one of the rotation shafts is insert-fitted to the side of the cylindrical drum.

2 Claims, 3 Drawing Sheets

50

PHOTOSENSITIVE DRUM FOR PRINTER CARTRIDGE AND METHOD FOR MOUNTING THE SAME

FIELD OF THE INVENTION

This invention relates to a photosensitive drum for a printer cartridge, and more specifically to a photosensitive drum for a printer cartridge, which can be easily mounted on the printer cartridge of which the positions of drum connectors are fixed, and a method for mounting the photosensitive drum on the printer cartridge.

BACKGROUNDS OF THE INVENTION

An electrophotographic image forming device is an apparatus for forming an image on a recording medium by an electrophotographic process. Examples of the image forming device include a copy machine, a printer, and so on, and the examples of the recording medium includes a paper, an OHP (Over head projector) film, and so on. The electrophotographic image forming process includes the steps of (1) forming a statically charged image or an electro-conductive image (generally, "latent image"), which corresponds to a recording image, on the surface of a photosensitive drum, for example OPC (Organic photoconductor) drum, (2) developing the latent image by statically adhering charged toner to the drum, (3) transferring the developed toner image on the recording medium such as a paper, and so on, and (4) fixing the transferred image on the recording medium with a heat-pressing roller. The image forming process has advantages of forming stable and clear image on the recording medium, obtaining printed or copied medium in a high speed, and easy operation of the electrophotographic image forming device.

In the image forming device, the photosensitive drum and an apparatus for charging, developing, and/or cleaning the photosensitive drum are integrated to form a cartridge (See U.S. Patent Application Publication No. 2005/0238387). FIG. 1 is an exploded perspective view of a conventional printer cartridge. As shown in FIG. 1, the conventional printer cartridge includes a photosensitive drum 10; a charging roller (Not shown) for forming a latent image by statically charging the photosensitive drum 10; a toner container 22 for containing toner which develops the latent image formed on the photosensitive drum 10; a developing roller 20 which is combined with the toner container 22 and develops the latent image by supplying the toner in the toner container 22 to the photosensitive drum 10; and a cleaning blade (Not shown) for removing residual toner remained on the photosensitive drum 10 after transferring the developed toner to a recording medium. The photosensitive drum 10, the charging roller, the toner container 22, the cleaning blade, and so on are connected to the frame 30 by connecting means, such as a pin 34, and so on. The photosensitive drum 10 can be made of an aluminum cylinder having a photosensitive layer on the surface thereof. A pair of rotation shafts 12a, 12b is formed on the sides of the photosensitive drum 10, and each of the rotation shafts 12a, 12b is rotatably connected to a pair of drum connectors 32a, 32b mounted on the cartridge frame 30. In other words, the pair of drum connectors 32a, 32b rotatably supports the photosensitive drum 10 on the cartridge frame 30. The photosensitive drum 10 rotates by a driving force of a motor (Not shown) mounted on the printer, and the driving force is transmitted to the photosensitive drum 10 through the rotation shafts 12a, 12b.

The integrated cartridge is detachably mounted on a copy machine, a printer, and so on. Accordingly, when the toner in the toner container 22 is used up or the life of the photosensitive drum 10 ends, the integrated cartridge is replaced with a new cartridge. Alternatively, the cartridge can be recycled by refilling new toner into the toner container 22, or by only replacing the used photosensitive drum 10 with a new drum. In case of replacing the used photosensitive drum 10, at least one drum connectors 32a, 32b should be separated from the cartridge frame 30. When the drum connectors 32a, 32b are detachably connected to the cartridge frame 30 by connection means such as a pin 34, a screw, and so on, the photosensitive drum 10 can be easily replaced. However, in some printers, for example Hewlett-Packard's HP2600 printer, the drum connectors 32a, 32b are permanently fixed on the cartridge frame 30, for example, with an adhesive, which makes it difficult to replace the photosensitive drum 10. If the permanently fixed drum connectors 32a, 32b are forcibly separated from the frame 30, it needs much time and efforts for replacing the photosensitive drum 10, the shape of the cartridge can be deformed, or the recycled cartridge may not properly work.

SUMMARY OF THE INVENTION

Therefore, it is an object of the present invention to provide a photosensitive drum for a printer cartridge, which can be replaced without changing the positions of drum connectors mounted on a cartridge.

It is other object of the present invention to provide a photosensitive drum for a printer cartridge, which can be replaced without deforming or disassembling the drum connectors or the cartridge frame.

It is another object of the present invention to provide a photosensitive drum for a printer cartridge, which properly works with the electrophotographic image forming device after the photosensitive drum is installed in the printer cartridge.

To accomplish these and other objects, the present invention provides a photosensitive drum, which comprises a cylindrical drum having a photosensitive layer on a cylindrical surface thereof; and a pair of rotation shafts which is respectively mounted on the sides of the cylindrical drum for rotating and supporting the cylindrical drum, wherein at least one of the rotation shafts is insert-fitted to the side of the cylindrical drum. Also, the present invention provides a method for mounting a cylindrical photosensitive drum on a printer cartridge, which comprises the steps of: inserting a first rotation shaft into a first drum connector of a pair of drum connectors, which are fixed on the cartridge frame and separated by a predetermined distance, wherein the first rotation shaft has a shape of being insert-fitted to a first side of the cylindrical photosensitive drum; inserting a second rotation shaft connected with a second side of the cylindrical photosensitive drum into a second drum connector of the pair of drum connectors; and insert-fitting the first rotation shaft to the first side of the cylindrical photosensitive drum by pushing the first rotation shaft to the direction of the cylindrical photosensitive drum.

DETAILED DESCRIPTION OF THE INVENTION

A more complete appreciation of the invention, and many of the attendant advantages thereof, will be better appreciated by reference to the following detailed description in conjunction with accompanying drawings.

Figure 1:
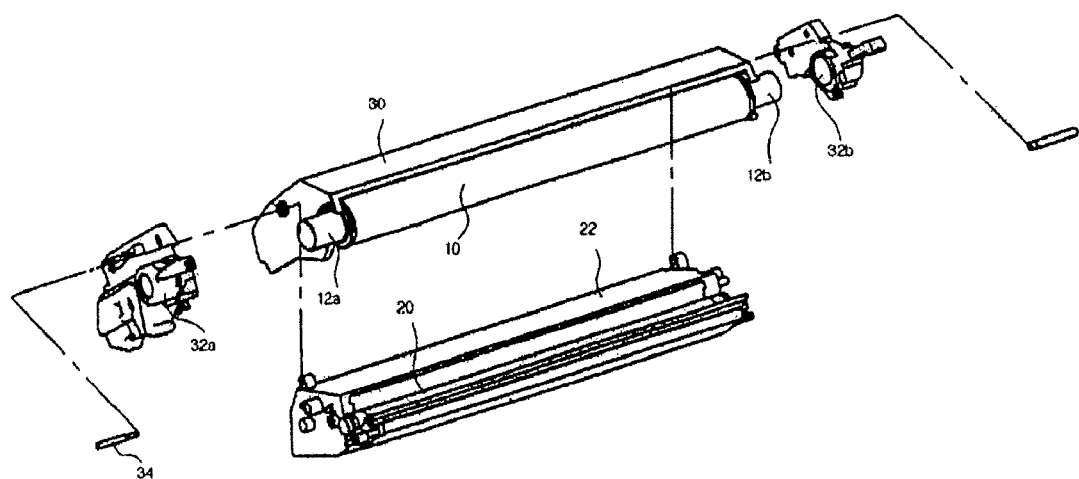
FIG. 1 is an exploded perspective view of a conventional printer cartridge.
Figure 2:
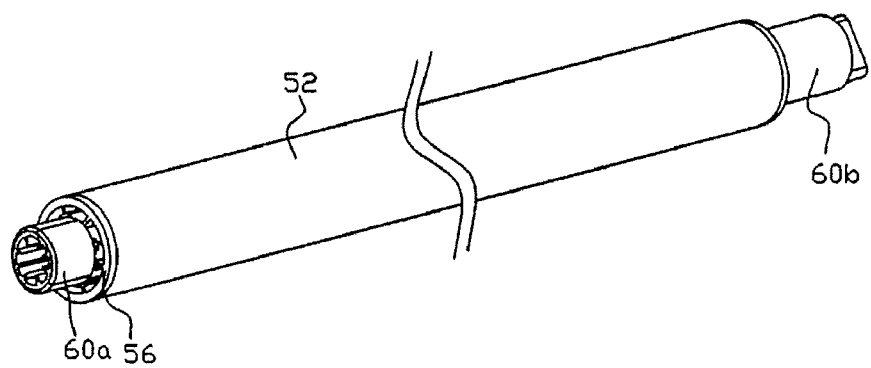
FIG. 2 is a perspective view of a photosensitive drum according to an embodiment of the present invention.
Figure 3:
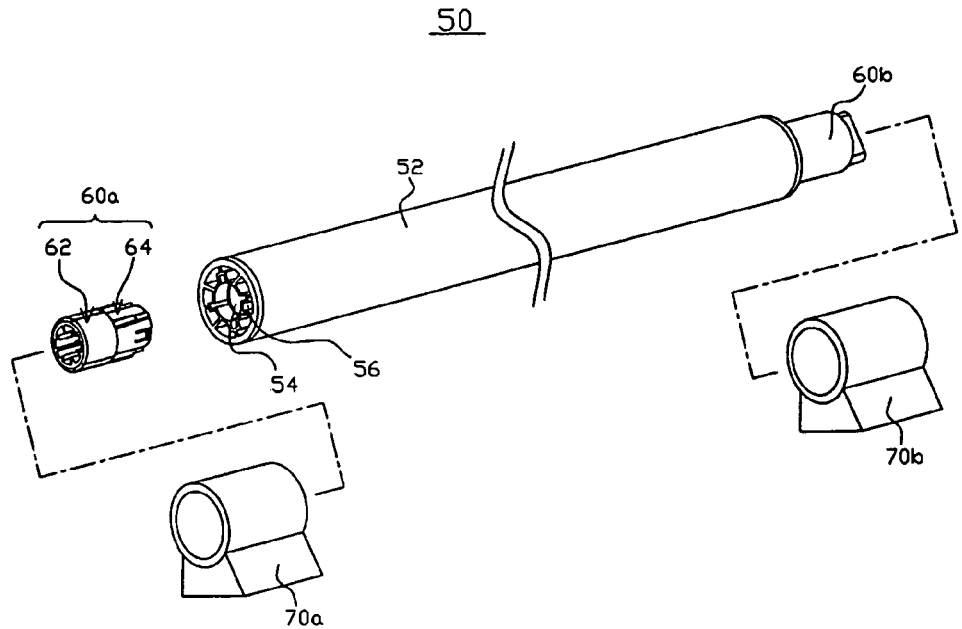
FIG. 3 is an exploded perspective view for showing the mounting process of a photosensitive drum according to an embodiment of the present invention.

FIG. 2 is a perspective view of a photosensitive drum according to an embodiment of the present invention, and FIG. 3 is an exploded perspective view for showing the mounting process of the photosensitive drum according to an embodiment of the present invention. As shown in FIG. 2 and FIG. 3, the photosensitive drum 50 according an embodiment of the present invention comprises a cylindrical drum 52 having a photosensitive layer on the cylindrical surface thereof, and a pair of rotation shafts 60a, 60b which is respectively mounted on the sides of the cylindrical drum 52 for rotating and supporting the cylindrical drum 52 wherein at least one of the rotation shafts 60a, 60b is insert-fitted to the side of the cylindrical drum 52. The cylindrical drum 52 can be a conventional photosensitive drum used in an electrophotographic image forming device such as a copy machine, a printer, and so on. The cylindrical drum 52 can be made of aluminum, and so on, and has a photosensitive layer on the surface thereof. Therefore, when a light corresponding to a recording image is irradiated to the photosensitive layer or a charging roller contacts with the photosensitive layer, a latent image corresponding to the recoding image is formed on the photosensitive layer. Then, charged toner is sprayed on the latent image formed on the cylindrical drum 52, and the latent image is developed. Therefore, by contacting a recording medium such as a paper with the developed drum 52, the developed image is transferred to the recording medium to form a printed or copied image.

FIG. 3 shows the mounting process of the photosensitive drum 50, in which the left rotation shaft 60a of the pair of rotation shafts 60a, 60b is insert-fitted to the left side of the cylindrical drum 52. As shown in FIG. 3, the rotation shaft 60a inserted into the cylindrical drum 52 may include a shaft body 62 and a shaft connector 64. The shaft connector 64 is insert-fitted to one side of the cylindrical drum 52 on the same axis line, and accordingly connects the rotation shaft 60a and the cylindrical drum 52. The shaft body 62 rotates and supports the cylindrical drum 52 after the shaft connector 64 is connected with the cylindrical drum 52. The sum of the length of the shaft body 62 and the length of the cylindrical drum 52 is larger than the distance between the drum connectors 70a, 70b to which the photosensitive drum 50 is inserted. The length of the cylindrical drum 52 is not larger than the distance between the drum connectors 70a, 70b, and preferably substantially equal to the distance between the drum connectors 70a, 70b. Also, the length of the rotation shaft 60a can be controlled so that the cylindrical drum 52 can be positioned between the drum connectors 70a, 70b, when the rotation shaft 60a is completely inserted into the drum connector 70a. In the cartridge to which the photosensitive drum according to the prevent invention is mounted, the drum connectors 70a, 70b are separated by a fixed predetermined distance.

With reference to FIG. 3, the method for mounting the cylindrical photosensitive drum on a cartridge frame according to an embodiment of the present invention will be described hereinafter. As shown in FIG. 3, the left rotation shaft 60a (the first rotation shaft) which will be insert-fitted to the cylindrical drum 52 is inserted to the left drum connector 70a (the first drum connector). Then, the right rotation shaft 60b (the second rotation shaft) connected with the cylindrical drum 52 is inserted to the right drum connector 70b (the second drum connector). Next, the left rotation shaft 60a (the first rotation shaft) inserted in the left drum connector 70a (the first drum connector) is pushed to the direction of the cylindrical drum 52, and then the shaft connector 64 of the left rotation shaft 60a is inserted to a hole 54 formed on the side of the cylindrical drum 52. Eventually, the first rotation shaft 60a inserted in the first drum connector 70a is connected (insert-fitted) with the side of the cylindrical drum 52. Therefore, by using the first rotation shaft 60a which can be insert-fitted to the cylindrical drum 52, the photosensitive drum 50 can be easily mounted on the drum connector 70a, 70b, even though the positions of the drum connectors 70a, 70b are fixed, In FIG. 3, the left rotation shaft 60a is insert-fitted to the cylindrical drum 52. However, the right rotation shaft 60b can also be insert-fitted to the cylindrical drum 52 in the same manner. Namely, one or more of the left and right rotation shafts 60a, 60b can be insert-fitted to the cylindrical drum 52. On the side of the cylindrical drum 52, a shaft receiving member 56 can be installed to provide the hole 54 to which the shaft connector 64 of the rotation shaft 60a is insert-fitted. The shaft receiving member 56 is tightly engaged with the cylindrical drum 52 and the shaft connector 64 to exactly transmit the rotation force of the left rotation shaft 60a to the cylindrical drum 52. Alternatively, the shaft connector 64 can be formed on the side of the cylindrical drum 52 and the shaft receiving member 56 can be formed on the rotation shaft 60a for the insert-fitting of the rotation shaft 60a and the cylindrical drum 52. The insert-fitting connection between the rotation shaft 60a and the cylindrical drum 52 can be performed by various methods, such as a screw-connection, a tight fitting connection, a protrusion-recess connection, and so on.

Figure 4:
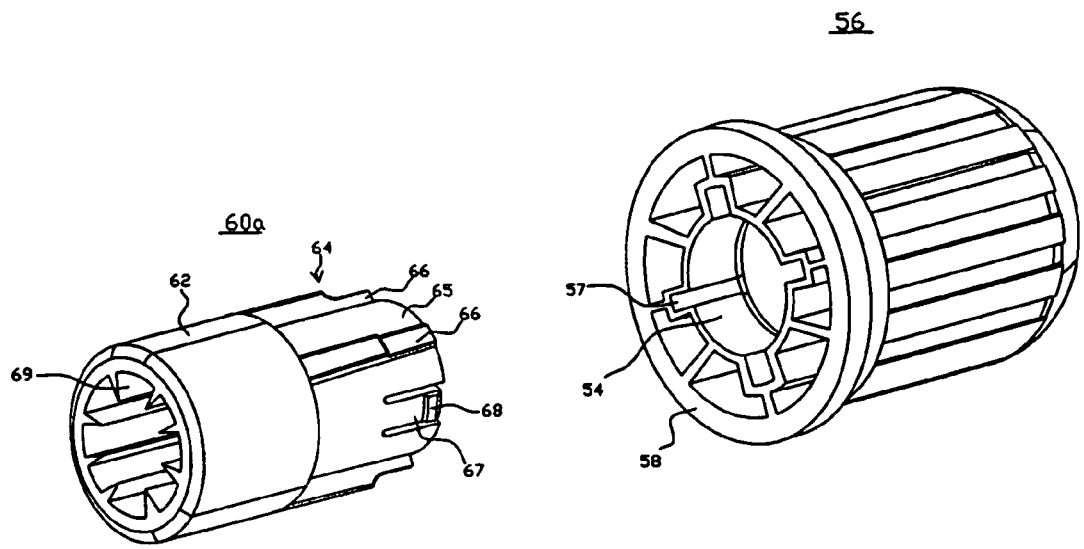
FIG. 4 is an enlarged perspective view for showing a rotation shaft and a shaft receiving member of a photosensitive drum according to an embodiment of the present invention.

FIG. 4 is an enlarged perspective view for showing the rotation shaft 60a and the shaft receiving member 56 of the photosensitive drum according to an embodiment of the present invention. As shown in FIG. 4, the rotation shaft 60a consists of the shaft body 62 and the shaft connector 64. The shaft body 62 has a cylindrical shape extending in the direction of the shaft axis. In the inside of the shaft body 62, one or more of protrusion 69 can be formed. The protrusion 69 is engaged with a force transfer means (Not shown), such as a gear, to transmit the rotational force of a motor for rotating the cylindrical drum 52. The shaft connector 64 may include: a cylindrical body 65 which extends in the direction of the shaft axis; one or more rotation preventing member 66 which is formed on the surface of the cylindrical body 65; and an elastic connector 67 which is formed at the cylindrical body 65 and has a hook 68 at the end thereof. The rotation preventing member 66 is formed to extend to the direction of the shaft axis, and preferably has a tapered shape so that the size of the rotation preventing member 66 (for example, thickness or height) is reduced in the outer direction of the shaft axis (namely, in the direction of the shaft receiving member 56). The elastic connector 67 can be formed by cutting the end part of the cylindrical body 65 in the direction of the shaft axis and in parallel with a predetermined interval, and by forming the hook 68 at the cut end. The shaft receiving member 56 also has a cylindrical shape, and is tightly inserted into the inside of the cylindrical drum 52. The hole 54 is formed inside of the shaft receiving member 56, and the cylindrical body 65 of the shaft connector 64 is inserted into the hole 54. On the hole 54 of the shaft receiving member 56, one or more tapered rotation preventing groove 57 is formed so that the rotation preventing member 66 is inserted. Also, the shaft receiving member 56 may have a connecting groove (Not shown) to which the hook 68 of the shaft connector 64 is inserted. Alternatively, the shaft receiving member 56 may have the length so that the hook 68 is caught at the end of the shaft receiving member 56. Accordingly, the hook 68 is caught in the inside of the shaft receiving member 56. As described above, the cylindrical body 65, on which the hook 68 is formed, is cut in parallel to provide the elastic force to the elastic connector 67. Therefore, when the shaft connector 64 is inserted to the shaft receiving member 56, the elastic connector 67 becomes bent inwardly. When the hook 68 is completely inserted to the connecting groove (Not shown) formed on the hole 54 of the shaft receiving member 56, the elastic connector 67 becomes bent outwardly, namely, is restored to its original shape. Eventually, the shaft connector 64 and the shaft receiving member 56 are tightly engaged. In this embodiment of the present invention, by pushing the shaft connector 64 to the direction of the shaft receiving member 56, the tapered rotation preventing member 66 of the shaft connector 64 is inserted into the tapered rotation preventing groove 57 of the shaft receiving member 56, and the hook 68 of the shaft connector 64 is engaged with the connecting groove or with the end of the shaft receiving member 56. Accordingly, the shaft connector 64 becomes firmly connected with the shaft receiving member 56. Also, a flange 58 can be formed on the peripheral part of the shaft receiving member 56 to prevent the shaft receiving member 56 from being excessively inserted into the inside of the cylindrical drum 52.

Figure 5:
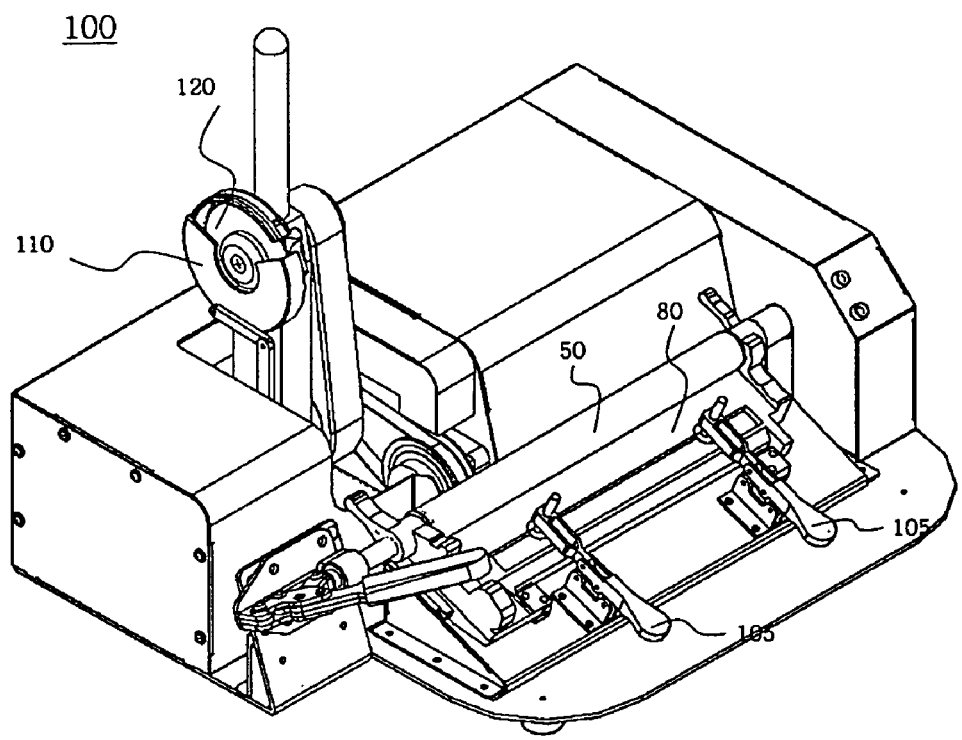
FIG. 5 is a perspective view for showing a cutting apparatus for cutting and removing a photosensitive drum mounted on a printer cartridge.

In case of removing a photosensitive drum from a printer cartridge, a cutting apparatus shown in FIG. 5 can be used. FIG. 5 is a perspective view for showing the cutting apparatus for cutting and removing a photosensitive drum mounted on a printer cartridge. As shown in FIG. 5, for removing a photosensitive drum, a cartridge 80 having the photosensitive drum 50 is mounted on the cutting apparatus 100 with a fixing grasper 105. The cartridge 80 is mounted on the cutting apparatus 100 so that a rotation cutting blade 120 contacts with the rotation shaft 60a between a cylindrical drum 52 and the drum connector 70a (For example, see FIG. 3) when a cutting member 110 is rotated to the direction of the cartridge 80. Then, the rotation cutting blade 120 rotates in a high speed to cut the rotation shaft 60a. By cutting the rotation shaft 60a, the photosensitive drum 50 can be removed from the cartridge 80. Alternatively, the photosensitive drum 50 can be removed from the printer cartridge 80 by cutting the cylindrical drum 52. The cutting apparatus 100 can be used to remove the photosensitive drum 50 of the present invention or an original photosensitive drum mounted on the printer cartridge.

As described above, the photosensitive drum for a printer cartridge according to the present invention can be mounted on the printer cartridge without changing the positions of drum connectors mounted on the cartridge. Therefore, the photosensitive drum can be replaced without deforming or disassembling the drum connectors or the cartridge frame. In addition, the photosensitive drum properly works with the electrophotographic image forming device after the photosensitive drum is installed in the printer cartridge. While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for mounting a cylindrical photosensitive drum on a printer cartridge, comprising the steps of:
    inserting a first rotation shaft into a first drum connector of a pair of drum connectors, which are fixed on a cartridge frame and separated by a predetermined distance, wherein the first rotation shaft has a shape of being insert-fitted to a first side of the cylindrical photosensitive drum;
    inserting a second rotation shaft connected with a second side of the cylindrical photosensitive drum into a second drum connector of the pair of drum connectors; and
    insert-fitting the first rotation shaft to a first side of the cylindrical photosensitive drum by pushing the first rotation shaft to the direction of the cylindrical photosensitive drum.

2. The method for mounting a cylindrical photosensitive drum on a printer cartridge of claim 1, wherein the first rotation shaft includes:
    a shaft body which is inserted into the first drum connector, and rotates and supports the cylindrical drum; and
    a shaft connector which is insert-fitted to the first side of the cylindrical drum, and accordingly connects the first drum connector and the cylindrical drum.

* * * * *